United States Patent
Mariuzza, Jr. et al.

(10) Patent No.: US 10,370,013 B2
(45) Date of Patent: Aug. 6, 2019

(54) SYSTEM AND METHOD FOR IDENTIFYING POINT DETECTION CALIBRATION PRIOR TO POINT DETECTOR LOCK-OUT AND SWITCH MACHINE FAILURE

(71) Applicant: ANSALDO STS USA, INC., Pittsburgh, PA (US)

(72) Inventors: Peter J. Mariuzza, Jr., Pittsburgh, PA (US); Kevin McQuistian, Apollo, PA (US); Sean Dowhy, East McKeesport, PA (US)

(73) Assignee: HITACHI RAIL STS USA, INC., Pittsburgh, PA (US)

( * ) Notice: Subject to any disclaimer, the term of this patent is extended or adjusted under 35 U.S.C. 154(b) by 228 days.

(21) Appl. No.: 15/421,086

(22) Filed: Jan. 31, 2017

(65) Prior Publication Data

US 2017/0137046 A1     May 18, 2017

Related U.S. Application Data

(62) Division of application No. 14/339,686, filed on Jul. 24, 2014, now Pat. No. 9,592,843.
(Continued)

(51) Int. Cl.
*B61L 5/10*         (2006.01)
*G01M 99/00*     (2011.01)
*B61L 27/00*       (2006.01)

(52) U.S. Cl.
CPC ............ *B61L 5/107* (2013.01); *G01M 99/00* (2013.01); *G01M 99/008* (2013.01); *B61L 27/0088* (2013.01)

(58) Field of Classification Search
CPC .. B61L 5/10; B61L 5/102; B61L 5/107; B61L 5/00; B61L 5/06; B61L 5/065
(Continued)

(56) References Cited

U.S. PATENT DOCUMENTS 2,915,622 A    12/1959  Coley
3,675,233 A      7/1972  Bencsics et al.
(Continued)

FOREIGN PATENT DOCUMENTS

CA           2 621 393 A1    3/2007
DE    20 2004 003 435 U1    7/2005
(Continued)

OTHER PUBLICATIONS

European Patent Office, "extended European search report, from corresp. EP appl. No. EP 14829720.3", dated Mar. 2, 2017, 11 pp.
(Continued)

*Primary Examiner* — Mark T Le
(74) *Attorney, Agent, or Firm* — Eckert Seamans Cherin & Mellott, LLC; Stephen A. Bucchianeri

(57) ABSTRACT

A detection and indication system for use in a railway switch machine which utilizes one or more roller members which physically interact with a point detector bar coupled to one or more switch points to provide an indication of a point failure upon movement of the point detector bar a predetermined distance from an initial position. The system includes a mounting structure structured to be coupled to a housing of the switch machine and a first sensing device coupled to the mounting structure. The first sensing device is positioned and structured to detect movement of the point detector bar a second predetermined distance from the initial position, wherein the second predetermined distance is less than the first predetermined distance.

9 Claims, 4 Drawing Sheets

Related U.S. Application Data

(60) Provisional application No. 61/857,842, filed on Jul. 24, 2013.

(58) Field of Classification Search
USPC .............................. 246/220, 253, 162, 401
See application file for complete search history.

(56) References Cited

U.S. PATENT DOCUMENTS

| | | | |
|---|---|---|---|
| 5,253,830 A | 10/1993 | Nayer et al. | |
| 5,669,587 A | 9/1997 | Van Alstine et al. | |
| 5,806,809 A | 9/1998 | Danner | |
| 6,164,600 A | 12/2000 | Seidl et al. | |
| 6,186,448 B1 | 2/2001 | Wydotis et al. | |
| 6,296,208 B1 | 10/2001 | Franke | |
| 6,366,041 B1 | 4/2002 | Bozio et al. | |
| 6,382,567 B2 | 5/2002 | Franke | |
| 6,427,949 B1 | 8/2002 | Hager et al. | |
| 6,474,605 B1 | 11/2002 | Wydotis et al. | |
| 6,484,974 B1 | 11/2002 | Franke et al. | |
| 8,341,851 B1 * | 1/2013 | Arnold .................... B61L 5/107 33/651 | |
| 2003/0106967 A1 | 6/2003 | Brushwood | |
| 2007/0162199 A1* | 7/2007 | Katsuta ............... B61L 27/0038 701/19 | |
| 2007/0228223 A1 | 10/2007 | Dittmar et al. | |
| 2011/0276285 A1 | 11/2011 | Alexander et al. | |
| 2013/0233992 A1 | 9/2013 | Darre et al. | |

FOREIGN PATENT DOCUMENTS

| | | |
|---|---|---|
| EP | 0 514 365 A2 | 11/1992 |
| EP | 0 957 020 A1 | 11/1999 |
| WO | 97/33784 A1 | 9/1997 |
| WO | 2007/028772 A1 | 3/2007 |

OTHER PUBLICATIONS

USPTO, "International Search Report and Written Opinion", from corresponding PCT/US14/47970, dated Nov. 28, 2014, 8 pp.

* cited by examiner

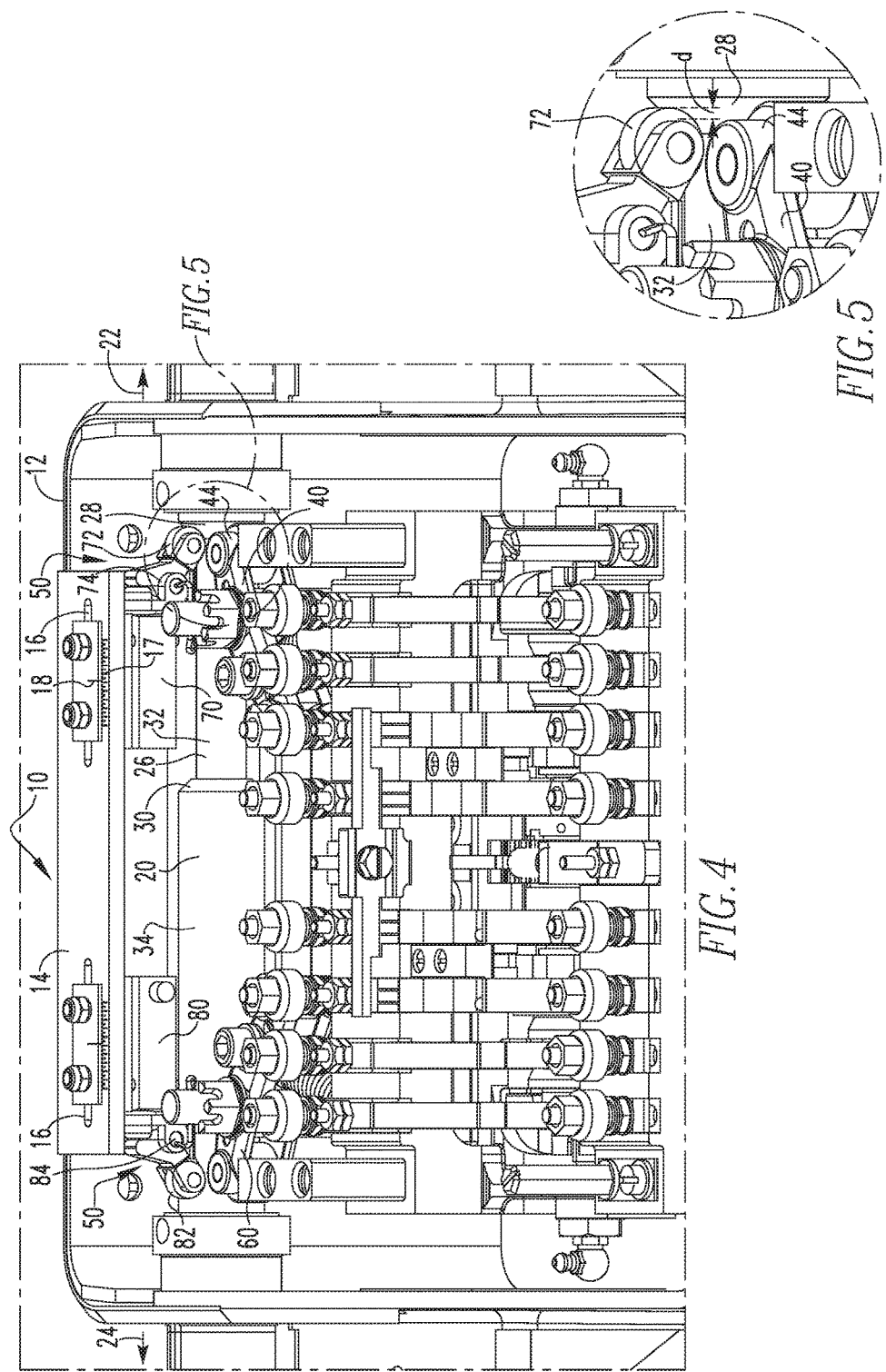

SYSTEM AND METHOD FOR IDENTIFYING POINT DETECTION CALIBRATION PRIOR TO POINT DETECTOR LOCK-OUT AND SWITCH MACHINE FAILURE

CLAIM TO PRIORITY

This patent application is a divisional of, and claims the priority benefit under 35 U.S.C. § 120 from, U.S. patent application Ser. No. 14/339,686, filed Jul. 24, 2014, entitled "System and Method for Identifying Point Detection Calibration Prior to Point Detector Lock-Out and Switch Machine Failure", which claims the priority benefit under 35 U.S.C. § 119(e) of U.S. Provisional Application No. 61/857, 842 filed on Jul. 24, 2013, and entitled, "System and Method for Identifying Point Detection Calibration Prior to Point Detector Lock-Out and Switch Machine Failure", the contents of each are hereby incorporated herein by reference.

FIELD OF THE INVENTION

The present invention relates generally to railway monitoring apparatus and, more particularly to a system and method for identifying point detection calibration prior to point detector lock-out and switch machine failure. The present invention also relates to railway switch machines including such systems.

BACKGROUND INFORMATION

A railway switch machine is used to divert a train from one track to another track. In many cases, the switch machine is remotely operated and, thus, an operator cannot see the machine. Consequently, the status of the machine (e.g., points detected and mechanically locked for either a straight-through or turn-out move) is provided by electrical circuits that, in turn, are interlocked with signals governing movement of the trains. According to typical convention, the term Normal (N) is employed for a straight-through move and the term Reverse (R) is employed for a turn-out move.

Historically, indication circuits for switch machines were implemented with cam operated or other types of mechanical switches within the machine. In some cases, the indication contacts of one machine are electrically connected in series with other machines. All interconnected machines must prove that their points are closed and mechanically locked before railroad signals are cleared, in order to permit movement of associated trains.

Motor control is also provided by mechanical switches. Basically, the motor rotates in opposite directions for Normal and Reverse. Rotary motion of the motor is converted to linear motion within the machine to move and lock the points. If the motor is being driven Normal, then contacts within the machine open the circuit path that would, otherwise, permit continued movement in that direction when the limit of intended motion is reached. However, a path is maintained that permits movement in the Reverse direction. In between the extreme positions, both current paths are closed for movement of the motor in either direction.

It is known to assign Right Hand Points Closed (RHPC) or Left Hand Points Closed (LHPC) to Normal by orientation of cam operated switches.

With mechanical controllers, a battery voltage is fed from the wayside case to contacts of a first switch machine. Then, if those contacts are closed, the battery voltage is fed on to the next machine, and so on. If all the contacts in the series string are closed, then the voltage fed back to the wayside case proves all switch machines are in correspondence, which is a condition necessary to clear signals.

Switch machines such as, for example, without limitation, M-3, M-23A and M23-B switch machines, are designed to detect drifting of switch points beyond a predetermined distance and in response thereto signal a point failure, thus stopping any traffic traveling along the line.

As described in Federal Railroad Administration (FRA) section 236.334 a switch machine must not give correspondence to clear a signal if the point closure is one-fourth of an inch when a latch-out device is not present or three eighths of an inch when it is present. When such separation distances are reached or exceeded, a linkage in the switch machine opens a set of contacts causing an open circuit and a loss of transmitted signal. In such instance, all train traffic along the line is stopped until a maintenance crew can physically inspect the switch machine and address/correct the cause for the undesired contact separation.

Accordingly, there remains a substantial need for a system which minimizes or eliminates such undesirable stoppages.

SUMMARY

Such need and others are met by the present invention in which an advance warning prior to the contacts exceeding the predetermined separation is provided.

In one example embodiment of the present invention, a detection and indication system for use in a railway switch machine which utilizes one or more roller members which physically interact with a point detector bar coupled to one or more switch points to provide an indication of a point failure upon movement of the point detector bar a predetermined distance from an initial position is provided. The system comprises: a mounting structure structured to be coupled to a housing of the switch machine; and a first sensing device coupled to the mounting structure. The first sensing device is positioned and structured to detect movement of the point detector bar a second predetermined distance from the initial position, wherein the second predetermined distance is less than the first predetermined distance.

The first sensing device may comprise a secondary roller member which is structured to physically interact with the point detector bar.

The first sensing device may further comprise a micro-switch which physically engages the secondary roller member.

The micro-switch may be adjustably coupled to the mounting structure.

The micro-switch may be adjustably coupled to the mounting structure via a slot.

The mounting structure may comprise indicia provided thereon for assisting in locating the secondary roller member with regard to the roller member of the switch machine.

The detection and indication system may further comprise a wireless transmission device in electrical communication with the first sensing device, the wireless transmission device being structured to wirelessly transmit a signal received from the first sensing device.

As another aspect of the present invention, a railway switch machine is provided. The railway switch machine comprises: a housing; a point detector bar slidably coupled to the housing, the point detector bar structured to be coupled to at least one moveable switch point of a railway system, the point detector bar including a recess portion formed therein, the recess portion defined at least in-part by a sloped portion disposed at one end; a roller member disposed adjacent to the point detector bar and positioned to physically engage the sloped portion of the recess portion upon movement of the point detector bar a predetermined distance from an initial position, the roller member being coupled to a switching mechanism structured to provide an indication of a point failure upon movement of the point detector bar the predetermined distance from the initial position; and a detection and indication system. The detection and indication system comprises: a mounting structure coupled to the housing and a first sensing device coupled to the mounting structure. The first sensing device includes a secondary roller member disposed adjacent the point detector bar and positioned to physically engage the sloped portion of the recess portion upon movement of the point detector bar a predetermined second distance, which is less than the first predetermined distance, from the initial position. The secondary roller member being coupled to the first sensing device in a manner such that a signal is produced by the first sensing device upon movement of the point detector bar the second predetermined distance.

The first sensing device may further comprise a micro-switch which physically engages the secondary roller member.

The micro-switch may be adjustably coupled to the mounting structure.

The micro-switch may be adjustably coupled to the mounting structure via a slot.

The mounting structure may comprise indicia provided thereon for assisting in locating the secondary roller member with regard to the roller member of the switch machine.

The railway switch machine may further comprise a wireless transmission device in electrical communication with the first sensing device, the wireless transmission device being structured to wirelessly transmit a signal received from the first sensing device.

As yet another aspect of the present invention, a method of providing early detection of point failure in a railway switch machine which utilizes one or more roller members which physically interact with a point detector bar coupled to one or more switch points to provide an indication of a point failure upon movement of the point detector bar a predetermined distance from an initial position is provided. The method comprises positioning a first sensing device adjacent the point detector bar such that the first sensing device produces a signal upon movement of the point detector bar a second predetermined from the initial position, wherein the second predetermined distance is less than the first predetermined distance.

The method may further comprise detecting that the point detector bar has moved at least the second predetermined distance via the first sensing device and responsive thereto, transmitting a signal from the switch machine.

Transmitting the signal from the switch machine may comprise wirelessly transmitting the signal.

The signal may be transmitted via a cellular transmission.

BRIEF DESCRIPTION OF THE DRAWINGS

While various embodiments of the invention are illustrated, the particular embodiments shown should not be construed to limit the claims wherein like numerals are used for like elements throughout. It is anticipated that various changes and modifications may be made without departing from the scope of the invention.

FIG. 4 is a detailed view of a portion of the view of FIG. 3.

FIG. 5 is a further detailed view of the portion of FIG. 4 indicated at 5-5.

DETAILED DESCRIPTION OF EXEMPLARY EMBODIMENTS

Referring to FIGS. 1-5, there is generally provided an example embodiment of a detection and indication system 10 in accordance with the present invention shown installed in a switch machine 2. In use, such switch machine 2 is located adjacent to a set of stock rails having a set of switching rails or switch points situated therebetween (not shown). Other than the detection and indication system 10 of the present invention, the general structure and positioning of switch machines relative to railroad tracks is known in the art and, therefore, will not be described in detail.

Figure 1:
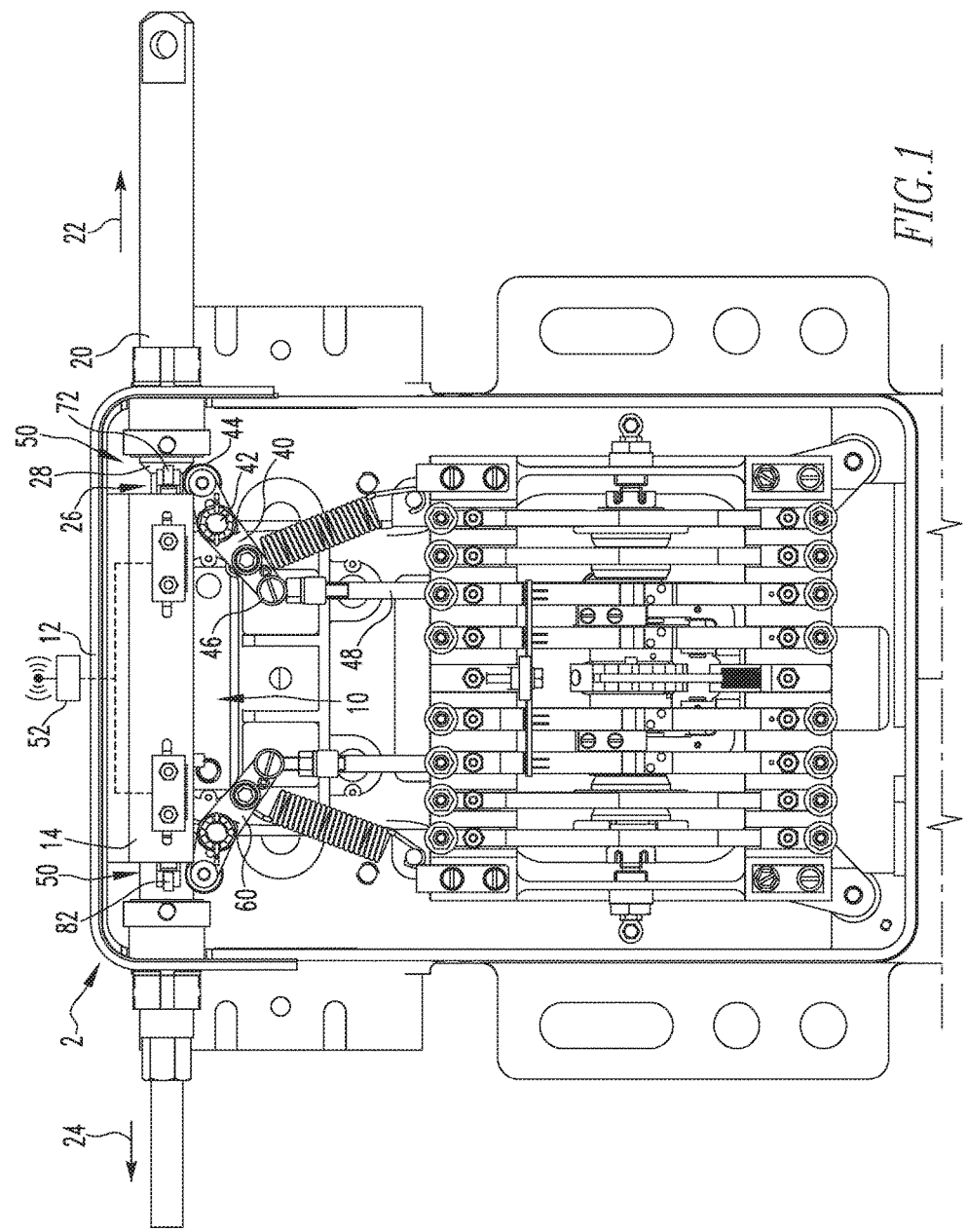
FIG. 1 is a planar view of a switch machine (shown with portion of the housing removed) including a detection and indication system in accordance with an example embodiment of the present invention.
Figure 2:
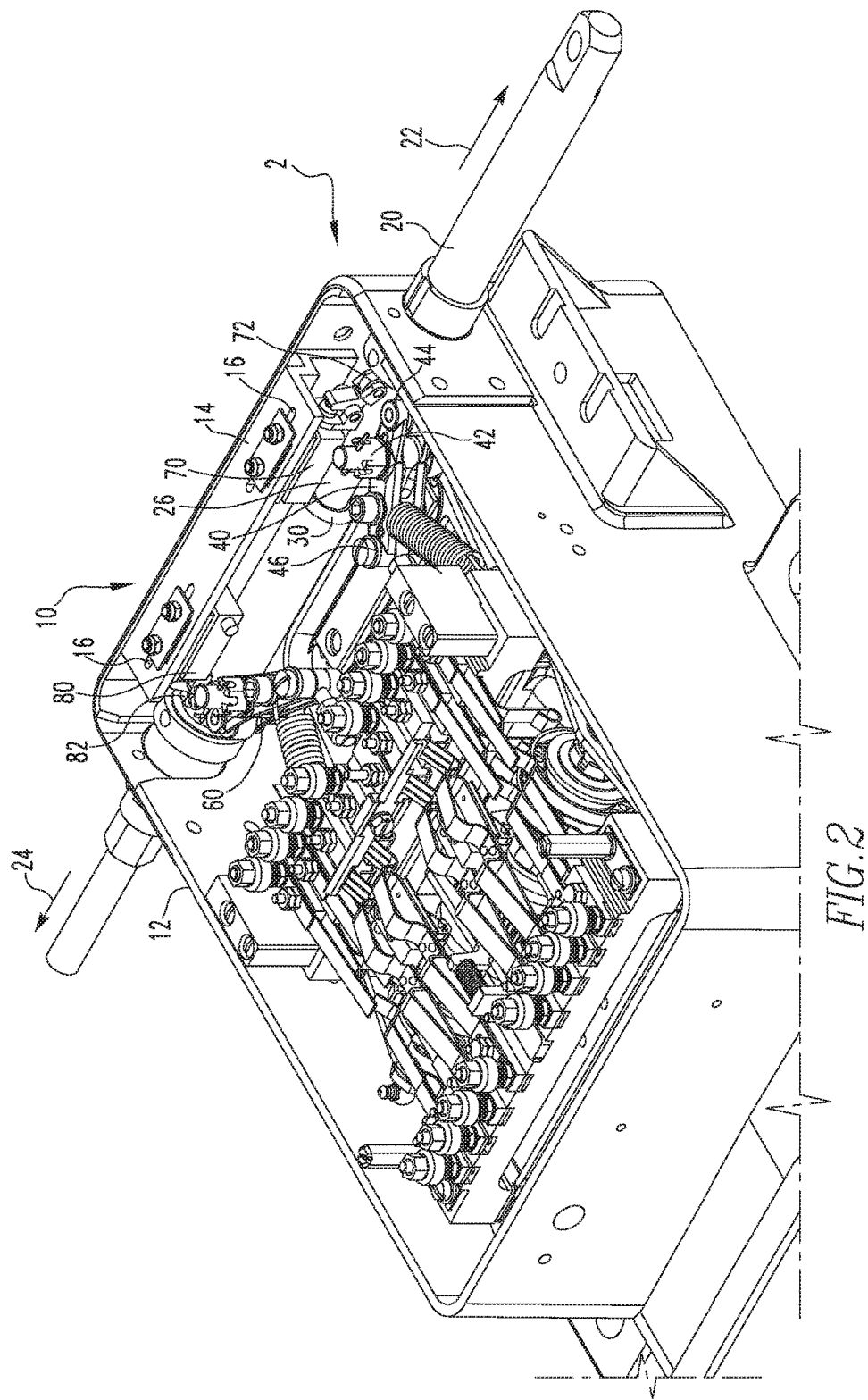
FIG. 2 is an isometric view of the arrangement of FIG. 1.
Figure 3:
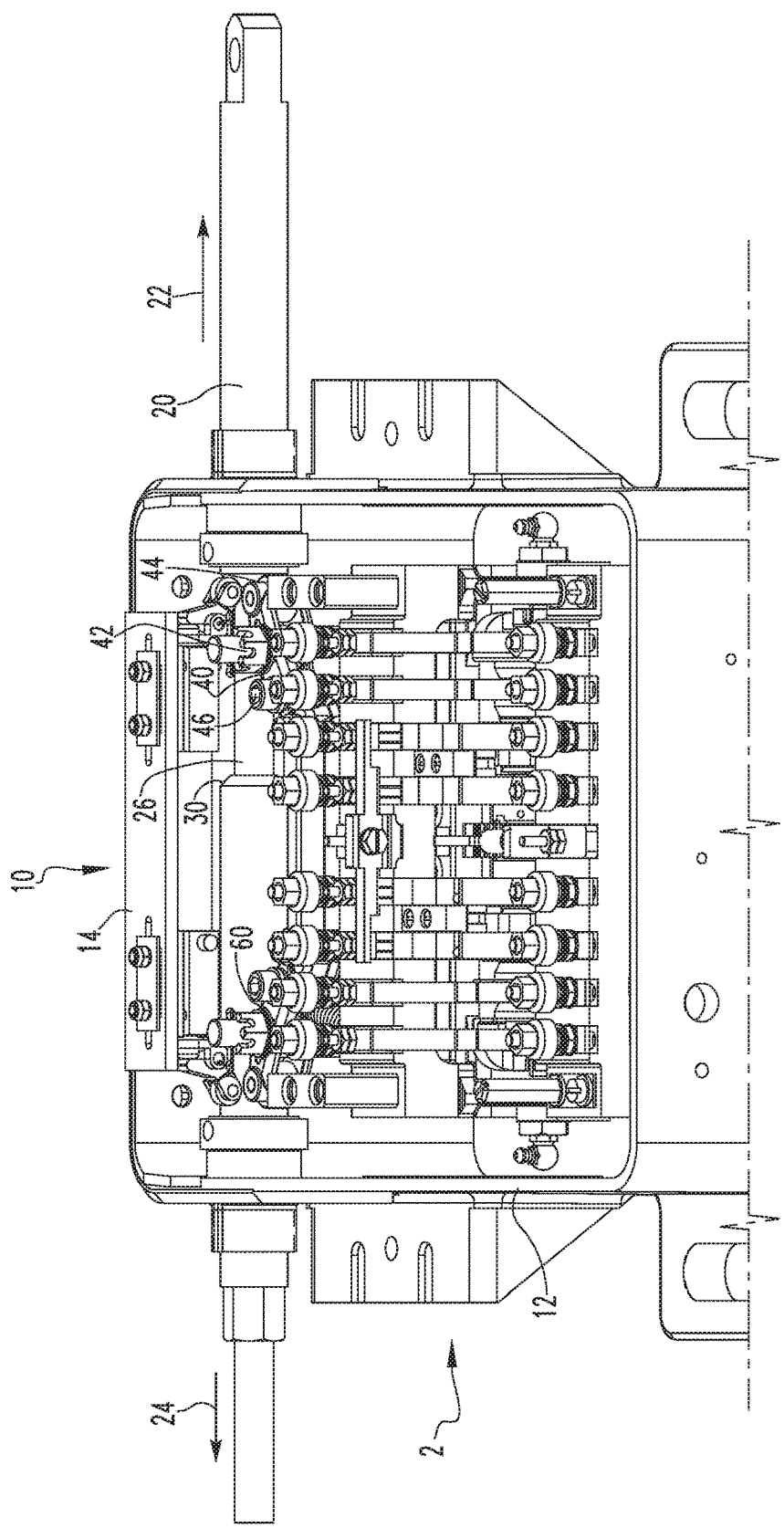
FIG. 3 is another view of the arrangement of FIG. 1.

Referring specifically to FIG. 1, there is shown an overhead planar view of a portion of the switch machine 2 in accordance with an example embodiment of the present invention with a cover (not shown) of the switch machine 2 removed to show internal details of the machine. Of the various components of the switch machine 2, only the housing 12 of the switch machine and the elements relevant to the operation to the detection and indication system 10 are shown/described in detail herein.

As commonly known in the art, switch machine 2 includes a point detector bar 20 in the form of a long cylindrical rod positioned perpendicularly across the longitudinal axis of the switch machine 2 such that linear movement of the point detector bar 20 corresponds to movement by the switching rails relative to the position of stock rail on either side (not shown). The point detector bar 20 is capable of moving in two opposing directions: a normal direction 22 and a reverse direction 24. When the point detector bar 20 is moving toward the railroad tracks (i.e., to the right in FIG. 1), the bar is moving in a normal direction 22; when the point detector bar is moving in the opposite direction away from the railroad tracks (i.e., to the left in FIG. 1), the bar is moving in a reverse direction 24.

Referring to FIGS. 1, 4 and 5, point detector bar 20 includes a recess portion 26 formed at a fixed position thereon, such that the detection and indication system 10 can identify any movement of the switching rails by monitoring the position of the recess portion 26. The recess portion 26 is an elongated notch grooved at a small portion of the point detector bar 20 having conical slopes 28, 30 at both ends. The conical slopes 28, 30 connect a smaller-diameter surface 32 of the recess portion 26 to the larger-diameter surface 34 of the rest of the point detector bar.

Adjacent to the point detector bar 20 is the normal cam follower 40 and the reverse cam follower 60. Since both cam followers 40, 60 have similar structures and functions, the normal cam follower is described in detail hereinafter, without equal reference to the reverse cam follower. Unless otherwise stated, the reverse cam follower 60 should be understood to have the same features as, or similar features to, the normal cam follower 40. The normal cam follower 40 has an elongated shape disposed about a pivot point 42 for stabilizing the normal cam follower 40 to the housing 12 of the switch machine 2. At one end of the cam follower 40 is a roller 44 and at an opposite end is an attachment point 46.

The roller 44 is positioned adjacent to the point detector bar 20 whereas the attachment point 46 is pivotally coupled to a signal rod 48 which is moveable generally toward or away from the point detector bar 20. In response to such movements, signal rod 48 is structured to cause contacts within the switch machine 2 to contact or separate, depending on the position of the rod 48.

Referring again to FIG. 1, operationally, when the switch points are disposed in the normal position (and thus the furthest switch point is disposed against the far rail), the point detector bar 20 is displaced in a position furthest to the right. When the point detector bar 20 is disposed in such position, roller 44 of cam follower 40 is disposed in recess portion 26. As the switch point disposed furthest from the switch machine 2 begins to move away from the far rail, the point detector bar correspondingly slides in direction 24, thus causing roller 44 to engage and begin to travel along conical slope 28. As roller 44 begins to travel along conical slope 28, cam follower 40 begins to rotate in a clockwise direction, thus causing the signal rod 48 to generally move toward the point detector bar 20. The arrangement is structured such that when the switch point reaches a predetermined distance (e.g., ¼ inch) from the rail the signal rod 48 will have traveled a sufficient distance to initiate a signal that the point has moved away from the rail and thus the switch has failed. Upon such switch failure, rail traffic must be stopped until the switch can be manually inspected and reset or repaired.

Likewise in reverse operation, as the aforementioned signal point approaches the far rail the roller 44 will descend into recess portion 26 along conical slope 28. As the roller descends along conical slope 28, cam follower 40 rotates in a counter-clockwise direction, thus causing the signal rod to generally move away from the point detector bar 20, and at a predetermined point cause a signal to be initiated the that the switch point is within a predetermined distance of the rail.

Embodiments of the detection and indication system 10 described herein provide early detection against such switch failure through the use of sensing devices 50 installed adjacent the point detector bar 20 for both normal and reverse directions 22, 24. With a sensing device 50 installed for both normal and reverse positions of the bar, each sensing device 50 can trigger in any mode that is sensed to be out of calibration more than a predetermined amount (e.g., without limitation, ⅛"). Once sensed, a signal can then be transmitted via a wired or wireless transmission (e.g., without limitation via cellular transmitter 52) to an Operation Control Center for the section of railway and/or to any other desired recipient (e.g., without limitation, maintenance personnel).

In an example embodiment of the present invention, each of the sensing devices 50 are connected to a Remote Terminal Unit (RTU) which provides for transmission of the output from each sensing device 50 to the governing authorities Operations Control Center (OCC). The RTU is equipped with either a cellular modem (such as transmitter 52 in FIG. 1) that will utilize a subscriber identification module (SIM) card to access the existing cellular communication system's global system for mobile communications (GSM) or an IEEE 802.11a/b/g/n compliant wireless radio to access a Wireless Local Area network (WLAN). Once the data is received at the OCC the output is logged in an Open Process Control (OPC) Server that provides interoperability to a variety of Human Machine Interface (HMI) and Supervisor Control and Data Acquisitions (SCADA) software.

In the example embodiment of the detection and indication system 10 shown in FIGS. 1-4, micro-switches 70 and 80 are utilized as sensing devices 50 to sense the position of the point detector bar 20. Detection and indication system 10 includes a mounting structure in the form of a bracket member 14 which is coupled to the housing 12 of the switch machine 2. Each of micro-switches 70 and 80 are adjustably coupled to the bracket member 14 via slots 16 formed in the bracket member 14. Such slots 16 allow for the position of each of the micro-switches 10 to be adjusted with respect to the corresponding roller of each of the cam followers 40, 60 of the of the switch machine such that the sensitivity (i.e., advance warning distance) of the particular micro-switch 70, 80 can be adjusted.

As perhaps best appreciated from the view shown in FIG. 4, each of the micro-switches 70, 80 physically engage the point detector bar 20 via a roller member 72, 82. Each roller member 72, 82 is pivotally coupled (via a respective pivot point 74, 84) to a respective micro-switch 70, 80.

As an example in reference to the normal cam follower 40, operationally, by spacing the roller 72 a predetermined distance "d" ahead of the roller 42 (such as shown in FIG. 5), the micro-switch 70 can provide an early warning that the detector bar is nearing the point where a point failure will be indicated (i.e., when roller 42 will have traveled out of recessed portion 26), and thus service of the switch machine and related mechanisms should be performed. Although described in conjunction with the normal cam follower 40, it is to be appreciated that micro-switch 80 operates in a similar manner with respect to the reverse cam follower 60.

As shown in the detailed view of FIG. 4, indicia 17 may be provided on bracket 14 in order to assist in locating the roller 72 (or other sensing device) with regard to roller 42 of the switch machine along with a corresponding indicator 18 or other suitable reference provided on or in regard to the sensing device 50.

In another example embodiment of the present invention, photoelectric optic sensors are used as sensing device 50 to detect the position of the point detector bar for both normal and reverse points. With a sensor installed on both sides of the detector bar the system can trigger in any mode that is sensed to be out of calibration more than ⅛". If this occurs, a signal is sent to the motor compartment of the switch machine to a sensor amplifier via fiber optics. The signal then is sent from the sensor amplifier to a wireless router outside the switch machine which then sends a signal that the points are not aligned correctly.

It is to be appreciated that the sensor mechanisms described herein are provided for example purposes only and are not intended to limit the scope of the present invention. It is also to be appreciated that output from the system described herein may be communicated via any suitable means without varying from the scope of the present invention.

We claim:

1. A method of providing early detection of point failure in a railway switch machine which utilizes one or more primary roller members which physically interact with a point detector bar coupled to one or more switch points to provide an indication of a point failure upon movement of the point detector bar a first predetermined distance from an initial position, the method comprising:

positioning a first sensing device adjacent the point detector bar such that the first sensing device, independent of movement of the one or more primary roller members, produces a signal upon movement of the point detector bar a second predetermined distance from the initial position, wherein the second predetermined distance is less than the first predetermined distance.

2. The method of claim 1, further comprising detecting that the point detector bar has moved at least the second predetermined distance via the first sensing device and responsive to said detecting, transmitting a signal from the switch machine.

3. The method of claim 2, wherein transmitting a signal from the switch machine comprises wirelessly transmitting the signal.

4. The method of claim 3, wherein the signal is transmitted via a cellular transmission.

5. A method of providing early detection of point failure in a railway switch machine which utilizes one or more primary roller members which physically interact with a point detector bar coupled to one or more switch points to provide an indication of a point failure upon movement of the point detector bar a first predetermined distance from an initial position, the method comprising:

positioning a first sensing device adjacent the point detector bar such that the first sensing device produces a signal upon movement of the point detector bar a second predetermined distance from the initial position, wherein the second predetermined distance is less than the first predetermined distance, and wherein the first sensing device comprises a secondary roller member and wherein positioning the first sensing device comprises engaging the secondary roller member with the point detector bar.

6. The method of claim 5, wherein the first sensing device further comprises a micro-switch which physically engages the secondary roller member.

7. The method of claim 6, wherein the micro-switch is adjustably coupled to the mounting structure.

8. The method of claim 7, wherein the micro-switch is adjustably coupled to the mounting structure via a slot.

9. The method of claim 8, wherein the mounting structure comprises indicia provided thereon for assisting in locating the secondary roller member with regard to the roller member of the switch machine.

\* \* \* \* \*

UNITED STATES PATENT AND TRADEMARK OFFICE
CERTIFICATE OF CORRECTION

PATENT NO. : 10,370,013 B2  
APPLICATION NO. : 15/421086  
DATED : August 6, 2019  
INVENTOR(S) : Peter J. Mariuzza, Jr. et al.

Page 1 of 1

It is certified that error appears in the above-identified patent and that said Letters Patent is hereby corrected as shown below:

In the Specification

Column 1, Line 66, "the, series" should read --the series--.
Column 5, Line 36, "the that" should read --that--.
Column 6, Line 12, "of the of the" should read --of the--.

Signed and Sealed this
Twenty-first Day of January, 2020

Andrei Iancu
*Director of the United States Patent and Trademark Office*